(12) United States Patent
Lanaro

(10) Patent No.: US 10,962,801 B2
(45) Date of Patent: Mar. 30, 2021

(54) SCREWLESS HINGE FOR A PAIR OF EYEGLASSES

(71) Applicant: M Group S.à.r.l., Luxembourg (LU)

(72) Inventor: Alessandro Lanaro, London (GB)

(73) Assignee: M Group S.à.r.l., Luxembourg (LU)

( * ) Notice: Subject to any disclaimer, the term of this patent is extended or adjusted under 35 U.S.C. 154(b) by 275 days.

(21) Appl. No.: 15/891,675

(22) Filed: Feb. 8, 2018

(65) Prior Publication Data

US 2018/0239166 A1 Aug. 23, 2018

(30) Foreign Application Priority Data

Feb. 17, 2017 (EP) ..................................... 17156703

(51) Int. Cl.
*G02C 5/22* (2006.01)

(52) U.S. Cl.
CPC ....... *G02C 5/2209* (2013.01); *G02C 2200/04* (2013.01)

(58) Field of Classification Search
CPC .............................................. G02C 5/22–229
USPC .................................................. 351/121, 153
See application file for complete search history.

(56) References Cited

U.S. PATENT DOCUMENTS

| | | | | |
|---|---|---|---|---|
| 1,593,617 A * | 7/1926 | Aldridge | ................. | G02C 1/08 351/99 |
| 2,288,657 A * | 7/1942 | Splaine | .................... | G02C 1/02 351/113 |
| 2,926,381 A | 3/1960 | De Angelis | | |
| 4,428,094 A * | 1/1984 | Emain | .................. | G02C 5/2281 16/228 |
| 4,818,093 A * | 4/1989 | Tabacchi | .............. | G02C 5/2245 16/228 |
| 4,844,606 A * | 7/1989 | Smith | .................. | G02C 5/2281 351/153 |
| 5,224,248 A | 7/1993 | Brilliant | | |
| 5,760,867 A * | 6/1998 | Pernicka | .................. | G02C 1/04 351/118 |
| 6,163,926 A * | 12/2000 | Watanabe | ................ | G02C 5/22 16/228 |
| 6,210,004 B1 * | 4/2001 | Horikawa | ............ | G02C 5/2209 16/228 |
| 6,336,250 B1 * | 1/2002 | Takeda | ..................... | G02C 5/10 16/228 |

(Continued)

FOREIGN PATENT DOCUMENTS

EP 1020752 A1 7/2000
FR 2923621 A1 5/2009
(Continued)

*Primary Examiner* — Nicholas R. Pasko
(74) *Attorney, Agent, or Firm* — Gardner, Linn, Burkhart & Ondersma LLP

(57) ABSTRACT

A hinge for eyeglasses has a first and a second frame part, the parts being joined in an articulated manner by a spindle element, the end of the first frame part having a bend which encloses at least in part the spindle element in a pivoting manner, wherein the bend of the first frame part forms two vertically spaced closed loops of a first diameter. The second frame part has a through hole of a second diameter and is positioned in the space between the two loops, such that the first frame part and the second frame part are swivelably connected by the spindle element, which reaches through both the loops and the through hole.

17 Claims, 3 Drawing Sheets

(56) References Cited

U.S. PATENT DOCUMENTS

| | | | | |
|---|---|---|---|---|
| 6,682,192 B2* | 1/2004 | Conner | ............... | G02C 1/02 |
| | | | | 16/228 |
| 7,222,960 B2* | 5/2007 | Thiele | ............... | G02C 5/2236 |
| | | | | 16/228 |
| 7,484,844 B2 | 2/2009 | Spandl | | |
| 8,875,346 B2* | 11/2014 | Thompson | ............ | G02C 5/2209 |
| | | | | 16/228 |
| 9,904,073 B2* | 2/2018 | Da Col | ............ | G02C 5/2281 |
| 2018/0011340 A1* | 1/2018 | Zider | ............... | G02C 5/2209 |

FOREIGN PATENT DOCUMENTS

| | | |
|---|---|---|
| WO | 2011068289 A1 | 6/2011 |
| WO | 2014092291 A1 | 6/2014 |

\* cited by examiner

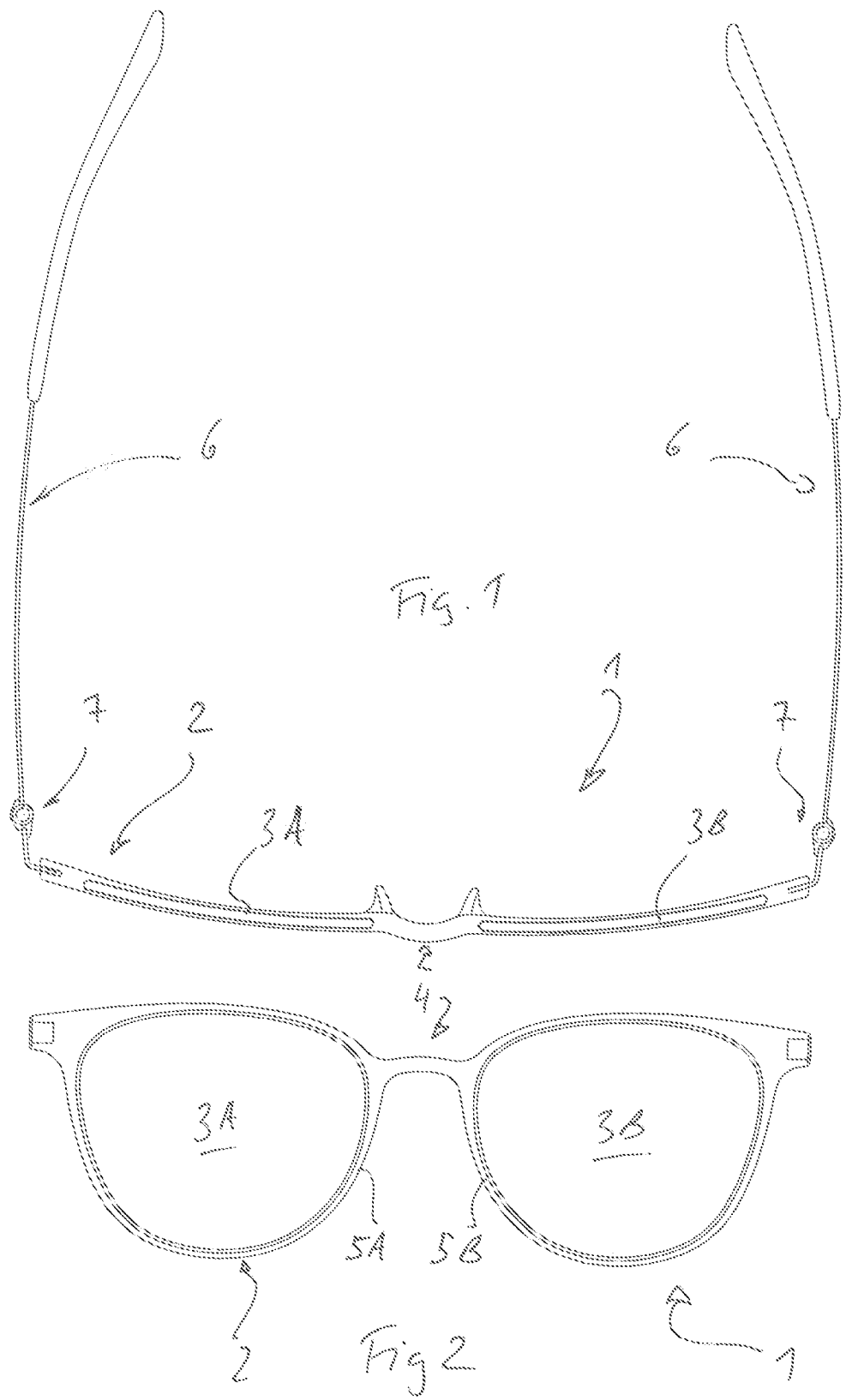

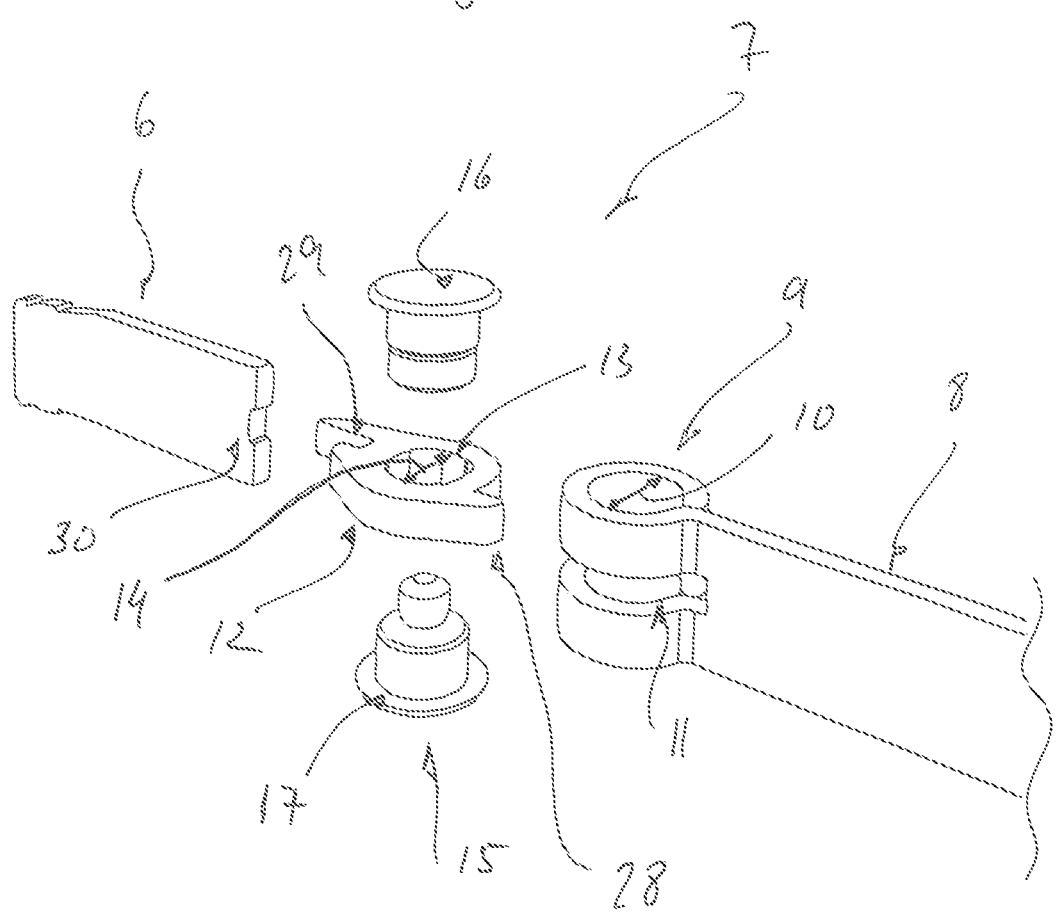

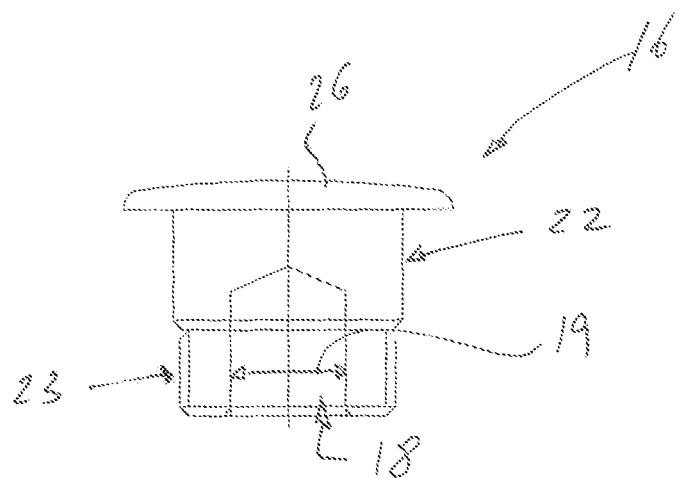
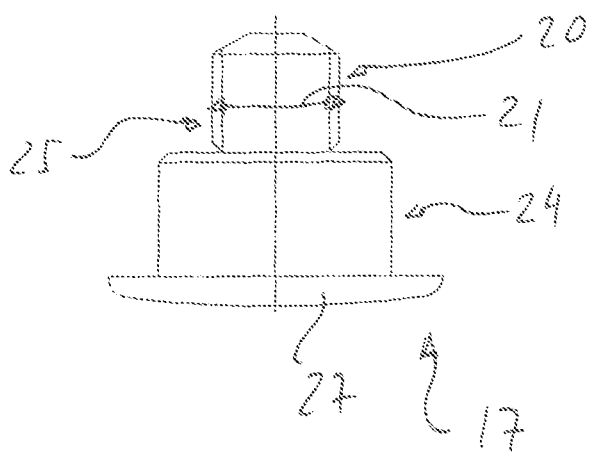
Fig. 4

SCREWLESS HINGE FOR A PAIR OF EYEGLASSES

CROSS REFERENCE TO RELATED APPLICATION

The present application claims priority of European patent application no. 17156703.5 filed Feb. 17, 2017.

BACKGROUND AND FIELD OF THE INVENTION

The invention relates to a screwless hinge for a pair of eyeglasses.

Screwless hinges are generally known in principle and have the advantage over the usual screw connection in the hinge that tends to loosen over time, especially leading to a wobbly frame or loss of the screw and disconnection of the hinge.

For example, U.S. Pat. No. 7,484,844 B2 discloses a hinge for spectacles, the hinge having two spectacle frame parts joined in an articulated manner by an axis element, the end of the first spectacle frame part having a first bend which encloses at least in part the axis element in a pivoting manner, and the second spectacle frame part being secured against rotation to the axis element. Also disclosed is a spectacle frame having this type of hinge. The disclosed hinge for spectacles is characterized in that an elastic tongue is formed in the second spectacle frame part, on the side of the hinge, having a second bend which encloses at least in part the first bend of the first spectacle frame part.

Such hinges are relatively complicated to manufacture and assemble and disassemble. Further they are not always suitable in terms of design or aesthetic aspects.

SUMMARY OF THE INVENTION

The present invention provides a screwless hinge that is easy to manufacture and assemble as well as disassemble and is also pleasing to the eye.

According to an aspect of the present invention, the hinge for a pair of eyeglasses has a bend in a first frame part that forms at least one closed loop of a first diameter, a second frame part has a through hole of a second diameter and is positioned in a space at the loop of the first frame part such the first frame part and the second frame part are swiveably connected by a spindle element that reaches through both the loop and the through hole. The spindle element is made up of two parts that are connected to each other and secure the two frame parts to each other while reaching through the respective loop(s) and through hole. This allows for an easy assembly and disassembly as well as a favorable aesthetic design.

According to a particular embodiment, the bend in the first frame part forms two loops with the space disposed between the loops. In a further embodiment, the first spindle element part and the second spindle element part are connected by press fit. Advantageously this can be achieved, if the first spindle element part has a bore of a first diameter and the second spindle element part has a pin with a second diameter slightly larger than the first diameter of first spindle element part, so as to allow the press fit, when the pin is inserted into the bore with the necessary force.

If the second diameter of the through hole is smaller than the first diameter of the loop(s), the spindle element can, in its assembled state, clamp the second frame part, so as to further secure it.

Further, if the first spindle element part has, in axial direction, a first portion having a diameter corresponding approximately to the diameter of the loop(s) and a second portion corresponding approximately to the diameter of said through hole, then the first spindle element part reaches through both openings and still create a hinge without play, such that the hinge has a smooth movement. Vice versa, in a particular embodiment the diameter of the second portion is slightly greater than the diameter of the through hole. This also allows for a press fit of the first spindle element part in the through hole of the second frame part.

The second spindle element part may have, in axial direction, a first portion having a diameter corresponding approximately to the diameter of the loops and a second portion forming the pin.

Together with the first spindle part and the embodiment in which the first frame part forms two vertically spaced closed loops, this allows for the spindle element to actually rotate in the loops, while clamping the second frame part in between the loops and spindle parts. This doubly secures the hinge against loss of the spindle element therefore creating not only a smooth hinge movement without play but also a long lasting hinge assembly that will not need much service.

To further prevent loss of the spindle elements and create an aesthetic appearance, it is advantageous if each spindle element part has an end cap with a diameter larger than the diameter of said loop(s), so that it covers the opening of the loop(s), whereby blocking view of the hinge workings.

To limit the range of the swivel movement of the hinge, the second frame part may have a stop flange extending in the direction of the first frame part and abutting the first frame part in an open position of the hinge, thereby limiting the range of the opening movement of the frame parts, preferably to a position in which they are aligned in the longitudinal direction.

To allow customization of the pair of eyeglasses for differing reasons, e.g. different size heads, the second frame part may be a universal connection part allowing use of differing temple frame parts. Then the second frame part may comprise a vertical notch into which variable temple frame parts may be secured.

BRIEF DESCRIPTION OF THE DRAWINGS

FIG. 1 shows a top view of a pair of eyeglasses;

FIG. 2 shows a front view of the eyeglasses of FIG. 1;

FIG. 3 shows an exploded view of the hinge according to an aspect of the invention; and FIG. 4 shows a section view of the spindle element parts of FIG. 3.

DESCRIPTION OF THE PREFERRED EMBODIMENTS

The figures show a pair of eyeglasses referenced with 1 as a whole. The pair of eyeglasses 1 is made up of a frame 2 and two eyeglass lenses 3A, B. The frame 2 comprises a nose frame part 4, which rests on the nose and has a left and right eyeglass frame parts 5A, B containing the lenses 3A, B. The frame 2 further comprises temple frame parts 6 which extend from the nose frame part 4 in the direction of the ears.

The temple frame part 6 and the nose frame part 4 are connected by a hinge assemble 7.

The hinge assembly 7 comprises a first frame part 8, one side of which is fixed to the nose frame part 4, e.g. by molding it into said nose frame part 4 during manufacture or gluing etc.

The first frame part 8 is bent by approx. 85 degrees and its second end has a bend which forms two vertically spaced closed loops 9 of a first diameter 10. The space 11 is formed by a cutout of the sheet metal forming the first frame part 8.

The hinge assembly 7 also comprises a second frame part 12 having a through hole 13 of a second diameter 14. The second frame part 12 is orientated and sized to fit into the space 11 in the assembled state, so as to be positioned in the space 11 between the two loops 9, such the first frame part 8 and the second frame part 12 can be swivelably connected by a spindle element 15. In the illustrated embodiment the second diameter 14 of the through hole 13 is smaller than the first diameter 10 of the loops 9.

Spindle element 15 is formed of formed of two parts 16, 17. The first (top) spindle element part 16 and the second (lower) spindle element part 17 are connected by press fit. The first spindle element part 16 has a bore 18 of a first diameter 19 and the second spindle element part 17 has a pin 20 with a second diameter 21 slightly larger than the first diameter 19 of first spindle element part 16, so as to allow the press fit during insertion of the pin 20 into the bore 18 in the assembly.

The first spindle element part 16 has, in axial direction, a first portion 22 having a diameter corresponding approximately to the diameter 10 of said loops 9 and a second portion 23 having a diameter greater the diameter 14 of said through hole 13. The second spindle element part 17 has, in axial direction, a first portion 24 having a diameter corresponding approximately to the diameter 10 of said loops 9 and a second portion 25 forming said pin 20. Further each spindle element part 16, 17 has an end cap 26, 27 with a diameter larger than the diameter of said loops 10, so as to further prevent loss of the spindle elements and create an aesthetic appearance.

The described build allows—in the assembled state—for the spindle element 15 to actually rotate in the loops 9, while clamping the second frame part 12 in between the loops 9 and spindle parts 16, 17, i.e. in the space 11. The collars of the first portions 22, 24 of the spindle element parts 16, 17 thereby abut the surface of the second frame part 12 in a clamping manner. The second frame part 12 rotates together with the spindle element 15 as it is by the press fit fixed to the second portion 23 of the first spindle element part 16.

To limit the range of the swivel movement of the hinge 7, the second frame part 12 has a stop flange 28 extending in the direction of the first frame part 8 and abutting the first frame part 8 in an open position of the hinge 7, thereby limiting the range of the opening movement of the frame parts 8, 12 to a position in which they are aligned in the longitudinal direction.

To allow customization of the frame 2, the second frame part 12 is a universal connection part allowing use of differing temple frame parts 6. For this reason, the second frame part 12 comprises a vertical notch 29 into which variable temple frame parts 6 are secured. To do so the temple frame parts 6 has a horizontal counter notch 30 fitting into the vertical notch 29 in a force fit manner. Both parts may be further secured to each other by welding, glue etc.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A screwless hinge for eyeglasses, the hinge comprising a first frame part and a second frame part joined in an articulated manner by a spindle element, with an end of the first frame part having a bend which encloses at least in part the spindle element in a pivoting manner, wherein the bend of the first frame part forms a pair of loops of a first diameter wherein the first diameter is constant over an axial length of the loops and wherein a space is disposed between the loops to form two vertically spaced loops, and wherein the second frame part has a through hole of a second diameter and is positioned in the space such that the first frame part and the second frame part are swivelably connected by the spindle element, which reaches through the loops and the through hole with the spindle element being formed of two parts, wherein said second diameter of the through hole is smaller than the first diameter of the loops, and wherein the second frame part has a stop flange extending in a direction of the first frame part and abutting the first frame part in an open position of the hinge, thereby limiting a range of an opening movement of the frame parts, and wherein a separate temple frame part is connected to the second frame part.

2. The screwless hinge for eyeglasses according to claim 1, wherein the stop flange abuts a side surface of the first frame part.

3. The screwless hinge for eyeglasses according to claim 1, wherein the range of the opening movement of the frame parts is limited by the stop flange to a position in which the frame parts are aligned in a longitudinal direction.

4. The screwless hinge for eyeglasses according to claim 1, wherein the second frame part is connectable to differing temple frame parts by means of a vertical notch at the second frame part, in order to allow customization of the pair of eyeglasses.

5. The screwless hinge for eyeglasses according to claim 1, wherein a first spindle element part and a second spindle element part are connected by press fit.

6. The screwless hinge for eyeglasses according to claim 5, wherein the first spindle element part has a first portion having a diameter corresponding to the diameter of said loops and a second portion, wherein the diameter of said second portion is greater than the diameter of said through hole.

7. The screwless hinge for eyeglasses according to claim 5, wherein each spindle element part has an end cap with a diameter larger than the diameter of said loops.

8. The screwless hinge for eyeglasses according to claim 5, wherein the first spindle element part has a bore with a first diameter and the second spindle element part has a pin with a second diameter, wherein the first diameter of the bore and the second diameter of the pin are dimensioned so as to enable the press fit connection of the pin of the second spindle element part with the bore of the first spindle element part.

9. The screwless hinge for eyeglasses according to claim 8, wherein the second spindle element part has a first portion having a diameter corresponding to the diameter of said loops and a second portion forming said pin.

10. A screwless hinge for eyeglasses, the hinge comprising a first frame part and a second frame part joined in an articulated manner by a spindle element, with an end of the first frame part having a bend which encloses at least in part the spindle element in a pivoting manner, wherein the bend of the first frame part forms a pair of loops of a first diameter and the first diameter is constant over an axial length of the loops with a space disposed between the loops, and wherein the second frame part has a through hole of a second diameter and is positioned in the space such that the first frame part and the second frame part are swivelably connected by the spindle element, which reaches through the loops and the through hole with the spindle element being formed of two parts, wherein said second diameter of the through hole is smaller than the first diameter of the loops, and wherein the second frame part has a stop flange extending in the direction of the first frame part and abutting a side surface of the first frame part in an open position of the hinge, thereby limiting a range of an opening movement of the frame parts, and wherein a separate temple frame part is connected to the second frame part.

11. The screwless hinge for eyeglasses according to claim 10, wherein the second frame part is connectable to differing temple frame parts by means of a vertical notch at the second frame part, in order to allow customization of the pair of eyeglasses.

12. The screwless hinge for eyeglasses according to claim 10, wherein a first spindle element part and a second spindle element part are connected by press fit.

13. The screwless hinge for eyeglasses according to claim 12, wherein the first spindle element part has a first portion having a diameter corresponding to the diameter of said loops and a second portion, wherein the diameter of said second portion is greater than the diameter of said through hole.

14. The screwless hinge for eyeglasses according to claim 12, wherein the first spindle element part has a bore of a first diameter and the second spindle element part has a pin with a second diameter, wherein the first diameter of the bore and the second diameter of the pin are dimensioned so as to enable the press fit connection of the pin of the second spindle element part with the bore of the first spindle element part.

15. The screwless hinge for eyeglasses according to claim 14, wherein the second spindle element part has a first portion having a diameter corresponding to the diameter of said loops and a second portion forming said pin.

16. An eyeglass frame having a pair of screwless hinges for pivotally connecting frame portions, said eyeglass frame comprising:
 left and right eyeglass frame parts, each said eyeglass frame part including a first frame part, and wherein each first frame part is joined in an articulated manner to a second frame part by a spindle element, and wherein a separate temple frame part is connected to each second frame part;
 wherein each first frame part has a bend which encloses at least in part the spindle element in a pivoting manner, wherein the bend of the first frame part forms a pair of loops each having a first diameter and wherein the first diameter is constant over an axial length of the loops and with a space disposed between the loops to form two vertically spaced loops, and wherein each second frame part includes a through hole of a second diameter with a respective one of each second frame part being positioned in the space such that the first frame part and second frame part are swivelably connected by the spindle element with the spindle element extending through the loop and the through hole, wherein said second diameter of the through hole is smaller than the first diameter of the loops, and wherein the spindle element is formed of two parts, and wherein each second frame part has a stop flange extending in a direction of the respective first frame part and abutting the first frame part in an open position of the hinge, thereby limiting a range of an opening movement of the frame parts.

17. The eyeglass frame of claim 16, wherein each second frame part is connectable to differing temple frame parts by means of a vertical notch at the second frame part, in order to allow customization of the pair of eyeglasses.

* * * * *